US012393419B2

(12) United States Patent
Muenzel et al.

(10) Patent No.: US 12,393,419 B2
(45) Date of Patent: Aug. 19, 2025

(54) INDUSTRIAL APPLICATION PACKAGE MANAGEMENT (71) Applicant: Siemens Aktiengesellschaft, Munich (DE)

(72) Inventors: Georg Muenzel, Waischenfeld (DE); Oswin Noetzelmann, Anaheim Hills, CA (US)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 17/925,041

(22) PCT Filed: May 19, 2020

(86) PCT No.: PCT/US2020/033510
§ 371 (c)(1),
(2) Date: Nov. 14, 2022

(87) PCT Pub. No.: WO2021/236057
PCT Pub. Date: Nov. 25, 2021

(65) Prior Publication Data
US 2025/0147755 A1 May 8, 2025

(51) Int. Cl.
G06F 8/71 (2018.01)
G06F 8/41 (2018.01)
(Continued)

(52) U.S. Cl.
CPC ............ G06F 8/71 (2013.01); G06F 8/433 (2013.01); G06F 8/65 (2013.01); G06F 21/577 (2013.01); G06F 2221/033 (2013.01)

(58) Field of Classification Search
CPC ......... G06F 8/433; G06F 8/60–66; G06F 8/71
(Continued)

(56) References Cited

U.S. PATENT DOCUMENTS

2012/0144378 A1 6/2012 Shah
2013/0283258 A1* 10/2013 Dube ................... G06F 8/61
717/174
(Continued)

FOREIGN PATENT DOCUMENTS

CN 108475360 A 8/2018
CN 109901872 A 6/2019

OTHER PUBLICATIONS

Kumar, Atul, et al., Analyzing Dependencies in an Industrial Automation Engineering System, Proceedings of the 8th India Software Engineering Conference, Feb. 2015, 10 pages, [retrieved on Mar. 10, 2025], Retrieved from the Internet: <URL:http://dl.acm.org/>.*
(Continued)

Primary Examiner — Geoffrey R St Leger (57) ABSTRACT

A system for industrial application package management includes a computing device having a processor and a memory having executable programs and applications stored thereon, including plurality of industrial application programs running an engineering project involving multiple different disciplines, and a package manager client. The package manager client communicates with a remote repository server that hosts application packages, and sends requests for packages and receives package deliveries. The package manager client unbundles package metainformation relevant to a domain specific application and according to an industrial package information schema. A dependency tracking module identifies dependencies of a current package to other packages and generates a dependency tree that includes the name and version of each dependent package. An upgrade analyzer compares dependency trees to identify dependency incompatibilities as conflicting packages based on inconsistencies and performs an automated resolution of the dependency incompatibilities.

20 Claims, 5 Drawing Sheets (51) Int. Cl.
  *G06F 8/65* (2018.01)
  *G06F 21/57* (2013.01)
(58) Field of Classification Search
  USPC .................................................. 717/168–178
  See application file for complete search history.

(56) References Cited

U.S. PATENT DOCUMENTS

| | | | |
|---|---|---|---|
| 2014/0109077 A1* | 4/2014 | Ashar ........................ | G06F 8/70 717/171 |
| 2015/0261653 A1* | 9/2015 | Lachambre ............... | G06F 8/75 717/126 |
| 2017/0371649 A1 | 12/2017 | Li et al. | |
| 2019/0339967 A1 | 11/2019 | Moondhra et al. | |

OTHER PUBLICATIONS

Decan, Alexandre, et al., An Empirical Comparison of Dependency Issues in OSS Packaging Ecosystems, 24th International Conference on Software Analysis, Evolution and Reengineering (SANER), Feb. 2017, 11 pages, [retrieved on Mar. 10, 2025], Retrieved from the Internet: <URL:http://ieeexplore.ieee.org/>.*
International Search Report corresponding to application No. PCT/US2020/033510; 4 pages.

* cited by examiner

| Interfacing, Usage samples 201 | Binaries 202 | Hardware Compatibility 203 | Package Dependencies 204 |
|---|---|---|---|
| Provider 205 | Engineering SW Compatibility 206 | Engineering SW data/integrations 207 | Custom Attachments 208 |
| Test Programs 209 | Domain-specific Source Code 210 | Performance Specs/ Limitations 211 | Hardware Recommendations 212 |
| Documentation 213 | Vendor Services 214 | Licensing 215 | IT Security Vulnerabilities 216 |

Industrial Package Information Schema (IPIS)

INDUSTRIAL APPLICATION PACKAGE MANAGEMENT

TECHNICAL FIELD

This application relates to management of software packages used by industrial applications. More particularly, this application relates to automation of finding, installing and removing versions of software packages in industrial applications.

BACKGROUND

A package manager or package-management system is a collection of software tools that automates the process of installing, upgrading, configuring, and removing computer programs for a computer's operating system in a consistent manner. Software of a package manager typically includes a Command Line Interface (CLI), which can install software packages from one or more software repositories over the Internet. Examples of application level dependency managers include npm for Node.js and javascript, pip for Python, or NuGet for the Microsoft development platform, and many more. Package managers help the user to maintain a consistent set of software parts for a specific project or application area, especially regarding the version of the underlying base system and other installed packages.

In industrial applications, where multiple domains of technology and engineering disciplines (e.g., electrical, mechanical, automation, etc.) must be coordinated, complexity of package management is ever present. An engineer may be faced with the technical problem of exchanging software applications, for example with business partners, suppliers, etc., and application information has to be bundled while ensuring that all of it relates exactly to the right version of the application solution and that all dependencies and related data are included. Coordinating multiple aspects of industrial applications, such as dependencies, hardware compatibilities, performance limitations and specifications, engineering software compatibilities, IT security vulnerabilities, application related vendor services, and/or binary management, is currently limited to a manual effort leading to frequent errors. Since the complexity of industrial applications is on the rise, and the need for collaboration across industries is increasing, this manual effort has become very difficult and time consuming.

SUMMARY

A system for industrial application package management includes a computing device having a processor and a memory having executable programs and applications stored thereon, including a plurality of industrial application programs running an engineering project involving multiple different disciplines, the project using packages of software data, the packages having interdependencies, and a package manager client. The package manager client communicates with a plurality of remote repository servers hosting industrial application packages. The package manager client sends requests for industrial application packages and receives deliveries of industrial application packages, each of the industrial application packages being versioned and bundled according to an industrial package information schema. The package manager client unbundles the industrial application packages to retrieve package data including package meta-information relevant to each industrial application package and to a domain specific application. A dependency tracking module identifies package dependencies of a first version of a first industrial application package and of an update version of the first industrial application package, and generates a first dependency tree for the first version and a second dependency tree for the update version of the first industrial application package including the name and version of each industrial application package of the identified package dependencies. An upgrade analyzer compares the first dependency tree and the second dependency tree to identify dependency incompatibilities as conflicting packages based on inconsistencies and performs an automated resolution of the dependency incompatibilities.

In an aspect, the upgrade analyzer executes a first attempt for resolution by upgrading the conflicting packages to later versions that are known to be compatible. On a condition that there are remaining unresolved conflicting packages, the upgrade analyzer executes a second attempt for resolution by downgrading more advanced versions of industrial application packages to achieve a degree of compatibility within a specified range. On a condition that there are remaining unresolved conflicting packages, the upgrade analyzer executes a third attempt for resolution by upgrading industrial application packages to new versions with unknown compatibility and performing a test compile to determine potential compatibility.

In an aspect, the system further includes a security vulnerability analyzer configured to investigate each package version used in the dependency tree of a package and to track identified vulnerabilities with respect to downloaded packages.

In an aspect, the plurality of software application programs includes an engineering software, and the package manager client is integrated with the engineering software allowing the user to operate the engineering software while the package manager client operates in the background to identify packages compatible with target hardware being designed by the engineering software.

In an aspect, the system further includes a bundling tool configured to bundle packages authored by a user, the packages being bundled in accordance with the industrial package information schema.

In an aspect, the meta-information may include one or more of the following: samples of interfacing and usage information; binaries for different target systems; hardware compatibility information; package dependencies; package provider information; engineering software compatibility information; engineering software data add-on and integration information; custom attachment information; test program information; domain specific software source code; performance specifications/limitations; hardware recommendations; documentation of the package contents; vendor information about package related services; known IT security vulnerabilities.

BRIEF DESCRIPTION OF THE DRAWINGS

Non-limiting and non-exhaustive embodiments of the present embodiments are described with reference to the following FIGURES, wherein like reference numerals refer to like elements throughout the drawings unless otherwise specified.

DETAILED DESCRIPTION

Methods and systems are disclosed for industrial application package management by an automated process. As a technical solution to the "dependency nightmare" that exists when a large engineering project involves a multitude of system components created and maintained using engineering tools of multiple software programs of different disciplines with unknown interdependencies and without any formally defined dependency structure, a package management system is disclosed for reliable addition, deletion and management of software versions, including features for engineering software integrations, binary management, license management, trust-service, strict versioning, vulnerability detection, and automatic resolution of incompatibilities. Packages to be managed may include different forms of data, such as low level software pieces in binary form (e.g., firmware for a robot) with little interfacing information, software applications to execute on a machine in either binary form, linkable objects, or source code (e.g., including interfacing information for software developed with open interfacing), information related to compiling source code, engineering information for engineering packages (e.g., various representations of a machine in different types of systems), or other forms of software data. The industrial application package management system maintains an industrial package information schema (IPIS) as a standardized data format for bundling and unbundling of industrial application packages, defining content and dependencies of each package with meta-information, allowing a package manager client to communicate with application repositories for access to remotely located software applications for upload or download of industrial application packages. Standardization of the IPIS may be established and formalized by an industrial standard body or organization, or by a de facto standardization introduced by a leading industrial vendor or supplier. The IPIS content is flexible and can be based on which properties a software vendor provides. Earlier engineering systems for industrial controllers were typically stand-alone, with no integration into any software development environment. More recently, some vendors support integration with version control or continuous integration environments. However, none supports anything like a multi-disciplinary package manager as disclosed herein. A technical advantage provided by the industrial application package management system of this disclosure includes automatic linkage to software repository locations, in contrast to present day manual searching. Other technical advantages include automatic handling of any version conflicts by checking compatibility of each new industrial application package with all installed industrial application packages; multi-disciplinary bundling of information to enable modern, multi-disciplinary digital twins; hardware compatibility selection; notifications of cybersecurity issues; immediately executable test suites; and built in usage instructions (e.g., documents, videos, interactive content, usage examples, etc.).

Figure 1:
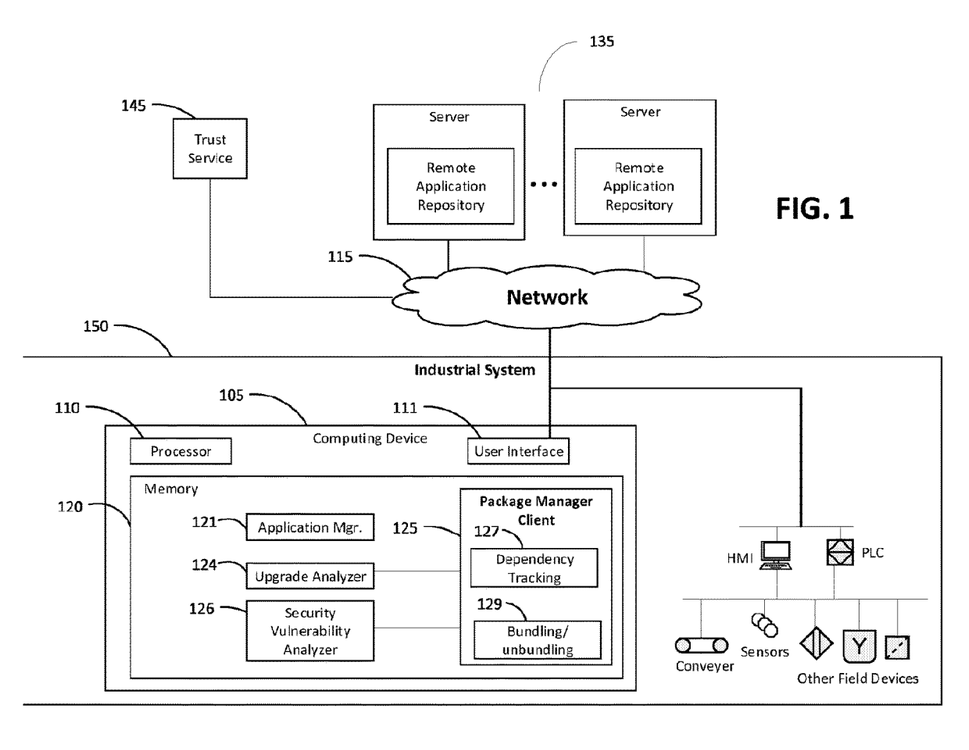
FIG. 1 is a block diagram for an example of a package management system in accordance with embodiments of the disclosure.

FIG. 1 is a block diagram for an example of industrial application package management in accordance with embodiments of the disclosure. In an embodiment, an industrial system 150 uses various controllers, such as programmable logic controllers (PLC) and human machine interfaces (HMI) among others to control a multitude of field devices (e.g., conveyors, robots, mixers, etc.) using feedback information from sensors. To coordinate hardware operation, such as field device operators, software applications are deployed in the controllers. Over the lifetime of the industrial system 150, industrial application packages are deployed, first with versions when originally installed, then with multiple updates and upgrades during operation and maintenance, and upon retirement of equipment when new software packages are deployed with the replacement equipment. The software applications may be deployed by downloading packages from server-based remote application repositories 135. To solve the technical problem of industrial application package management, a package manager client 125 coordinates the transfer of information relevant to a domain specific application when packages are bundled by repositories 135 and downloaded via network 115. In an embodiment, a computing device 105 includes a processor 110 and a memory 120, on which program modules are stored for execution by processor 110, including the package manager client 125, an application manager 121, upgrade analyzer 124, and security vulnerability manager 126. Package manager client 125 includes a dependency tracking module 127 for defining and maintaining formal dependencies between industrial application packages, and a bundling/unbundling tool 129 used for unbundling requested packages received in a download from a repository 135, or bundling packages authored by a user to be uploaded and stored remotely.

Package bundling according to the industrial application package management of this disclosure establishes and maintains a formal definition of software dependencies in industrial applications according to an industrial package schema like the IPIS, allowing packages to be bundled and unbundled on demand. For example, in an engineering project for industrial system 150 that may involve design or modification of all or part of the system components, there may be multiple software applications deployed (e.g., software tools, programs, or applications for automation, electrical, mechanical, product lifecycle management, and/or other disciplines), each comprising multiple blocks or mini programs that can run in conjunction with a user interface 111, where one block may call on another block to retrieve information. In an aspect, some blocks may be dependent on another project with its own blocks. Within a project, industrial application package dependencies can be defined and tracked by dependency tracking module 127, and useable blocks can be identified to a project engineer at user interface 111. In an embodiment, dependency files are defined by dependency tracking module 127 with pointers to repositories 135 where the blocks are available, allowing the blocks to be downloaded automatically when needed. The pointers can be generated and established in several ways, including any of the following. The package manager may be configured with a catalogue of pointers. As another aspect, the user can configure one or more remote repositories that provide catalogues. An organization could also provide a catalogue of repositories for public use. An equipment vendor can provide the pointers to dedicated repositories as a deployment feature. The pointers can be stored by dependency tracking module 127 in a dependency tree format. In an embodiment, the automatic dependency definition by package manager client 125 solves a problem of inaccurate bundling of dependency information for a package by conventional means (i.e., manually), which involves aggregating everything into one large project while ensuring a complete set of dependencies is included along with accurate versioning, compiling the very large project with dependencies, and running as one set. The technical solution includes defining dependencies to other blocks needed for the current project, such as blocks that are new to a project, rather than aggregating everything in an over-inclusive manner based on previous projects. An advantage of dependency tracking is enablement of side-by-side installation of industrial application packages of different versions. For example, two versions of a software package can be available to industrial system 150, with dependency libraries tracked using the dependency trees, where the older version is kept in place due to special interfacing requirements with a particular dependent software while the newer version upgrade can be deployed with improved performance with interfacing elsewhere throughout the network. Another advantage of the automatic dependency definition is that any software blocks not needed for the current project are excluded from a new industrial application package, and unnecessary blocks can be removed from the industrial application package for any package updates.

Remote application repositories 135 may be internet server-based locations for software applications to be managed by the industrial application package management system. For example, a repository 135 may be a service hosted at an internet accessible server (e.g., cloud server) and accessed by client computers 105 over a computer network 115 (e.g., the internet). A repository 135 for hosting an industrial application package may also be configured as a peer-to-peer network of computers accessible by the computing device 105. Repositories 135 provide public or restricted access to a database of industrial application packages. Each computing device 105 may download and install one or more industrial applications from respective repositories 135 via the application manager 121.

The package manager client 125 may access the repositories 135 and upload or download industrial application packages. In an embodiment, package manager client 125 utilizes a managed repository address book that contains a list of the known repository communication endpoints as well as relevant meta-data about the repositories 135 (such as identity of repository operator, what is the domain or specialization of the repository, etc.). Repository 135 addresses can be advertised through a peer-to-peer communication protocol, through trusted lists, and can come pre-configured with the client address book or exchanged through other means.

Upgrade analyzer 124 is a module configured to determine which industrial application packages to propose for dependency upgrade based on dependency tree analysis and to download when performing an upgrade operation. An instance when upgrade analysis may arise may be upon a vendor offering a new industrial package application version (e.g., a conveyor manufacturer offer to an automation engineer) having new additional features. However, such new features could result in calls for software blocks during runtime of the industrial application triggering "breaking changes" (i.e., induced address errors) for new parameters not available in the previous version. Conventional solutions include notifying the user of breaking changes, requiring manual investigation of interface troubles before executing the version upgrade. Using the upgrade analyzer 124, the program manager client 125 can automatically determine an upgrade solution that may include modification of industrial application packages to align with new parameters. The upgrade analyzer 124 evaluates a dependency tree for a given package version against another dependency tree for a candidate upgrade version. In an embodiment, the program manager 125 receives an indication that a package version update is available, and communicates with the update analyzer 124 to perform an update analysis. The upgrade analyzer 124 derives which packages requires upgrading and to which specific version by determining the differences between dependency trees by comparison. Incompatibilities and conflicts are identified, and automatic resolution attempts are performed by the upgrade analyzer 124. In cases where automatic resolution requires user assistance, the user may be notified via user interface 111 and user inputs may be requested and received by the package manager client 125.

In an embodiment, the upgrade analyzer 124 executes the following steps to determine candidate upgrade versions. An algorithm compares two dependency trees, one for each respective industrial application package version, while walking up each dependency tree, noting differences. For new and changed branches of a dependency tree for the new industrial application package version, the algorithm reads all known incompatibilities and compares each with all other parts of the new dependency tree. For all incompatible packages that are classified to be a version conflict, the algorithm executes a first attempt to upgrade the conflicting packages to later versions that are known to be compatible. In an aspect, the first attempt may be executed until a degree of compatibility within a specified range of scope is achieved. On a condition that there are remaining unresolved conflicting packages, the algorithm executes a second attempt for resolution by downgrading the industrial application packages with more advanced versions to achieve a degree of compatibility within a specified range. For any remaining incompatible dependencies, the algorithm executes a third attempt at resolution by upgrading industrial application packages to new versions with unknown compatibility and performs a test compile to determine potential compatibility. In an embodiment, for all new and changed industrial application packages, the algorithm performs a security analysis. All steps performed by the algorithm are recorded into a report that outlines the achieved degree of compatibility. The report further includes all necessary documentation for upgrades requiring user assistance (e.g., manual steps) for changed interfaces and required upgrade steps for the user.

Security vulnerability analyzer 126 is a module used by the package manager client 125 to actively identify issues with industrial application packages that a user is using and propose solutions. For example, an event may trigger the security vulnerability analyzer 126 to initiate an inquiry for whether a particular industrial application package is vulnerable, and the package manager client 120 communicates the inquiry to the repository 135 using a communication format recognized by the repository 135. A triggering event may include, for example, the addition of a new engineering tool to an engineering project or replacement of an industrial piece of equipment with vendor provided control software. Another triggering event could be any change in the dependency tree for a package. Security notices can also be requested frequently or pushed from a server. Using knowledge of known and identified vulnerabilities, the repository 135 responds with the vulnerability information, and the package manager client 125 may then take steps to upgrade the industrial application package automatically and safely via the upgrade analyzer 124 according to the process described herein. In an aspect, repository 135 may maintain a database of identified security of vulnerabilities for specific package versions, along with fixed vulnerabilities for newer versions, which can be queried by security vulnerability analyzer 126 via the package manager client 125. The security vulnerability analyzer 126 investigates each package version used in the complete dependency tree of a package and is responsible for tracking identified vulnerabilities with respect to packages downloaded for projects. Multiple sources for knowledge about vulnerabilities of the specific versions are considered, such as the repository database of vulnerabilities, newer package versions that point out vulnerabilities of previous versions, and additional vulnerability databases when available.

In an embodiment, security vulnerability analyzer 126 queries an AI-based security monitoring tool about monitored incidents on a corporate network. In another embodiment, security vulnerability analyzer 126 interfaces with an industrial application during runtime to trigger a security management event in response to a detected security vulnerability (e.g., trigger an analysis mechanism on plant operation, or shut down an assembly line in a controlled way).

Trust service 145 is an optional service component that can be hosted by a third party to verify the legitimacy of a repository and its communication endpoint. In an embodiment, package manager client 125 can use trust service 145 to determine the trust-status of available repositories 135 to confirm that the address of the repository is legitimate and not an imposter address. In an embodiment, the industrial application package contents of are bundled by the repository, and the bundle is hashed to provide a checking mechanism for correctness of the bundle, which can detect changes during transport or malicious attempts (e.g., "man-in-the-middle" attack). In another embodiment, an error-detecting code such as a cyclic redundancy check (CRC) can be applied to the bundle. The trust service 145 is used to perform the error detection check for whichever error-detecting code or hash function is applied.

Figure 2A:
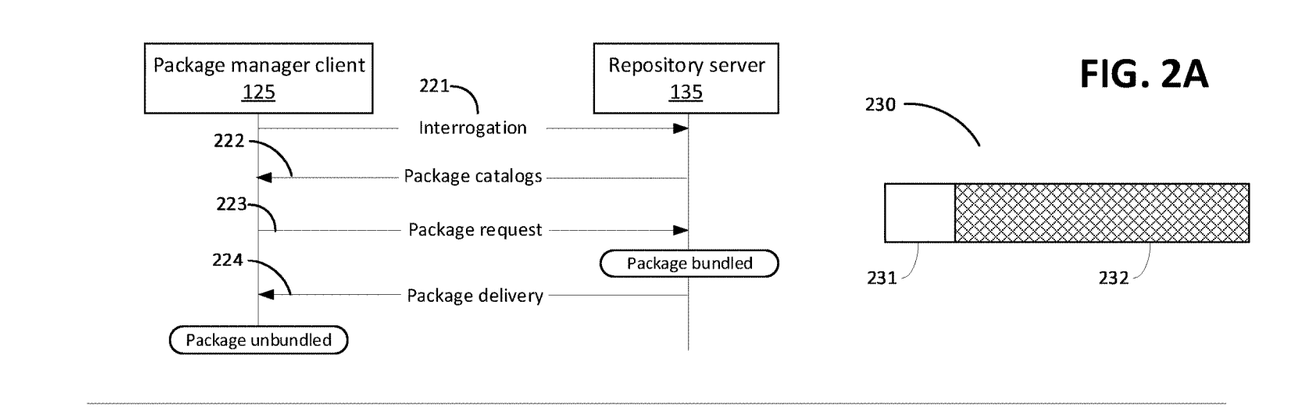
FIGS. 2A and 2B are block diagrams for an example of an industrial package information schema definition and delivery for exchanging package data in accordance with embodiments of the disclosure.
Figure 2B:
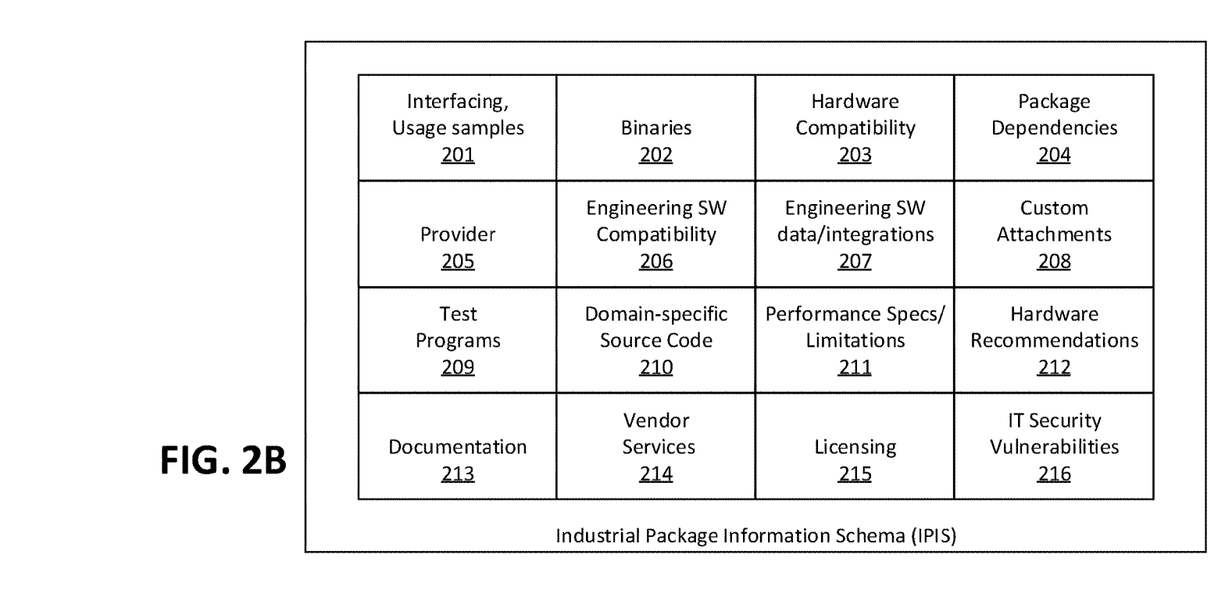

FIGS. 2A and 2B show block diagrams for an example of an industrial package information schema (IPIS) definition and delivery for exchanging package data in accordance with embodiments of the disclosure. In an embodiment, industrial application packages are exchanged between repositories 135 and package manager client 125 with a standardized schema, the IPIS, for exchanging meta data related to the industrial application package. In an aspect, participating vendors provide industrial application packages according to a cloud-based distribution system and may pay a fee to provide software on the network from repositories 135 with an agreement to apply the IPIS format. For industrial application packages bundled by the repository 135 for download to the package manager client 125, the IPIS information is included in the bundling. In an embodiment, industrial application packages combine all information that is relevant to a domain specific application. For example, a package may be bundled as software and meta-information for a PLC-controlled automation of a conveyor belt group and the corresponding HMI screens. The bundled industrial application package may include IPIS information that defines the binary structure of the package, along with optional compression and all meta-information that is relevant to the content of the package. As shown in FIG. 2A, the package manager client 125 sends interrogation signal 221 to repository server 135 as a request for package catalogs and security notes. For example, the package manager client 125 may update a list of package inventory by interrogating all available repositories 135. Repository server 135 delivers the interrogation response 222 that may include package catalogs. The package manager client 125 requires an industrial application package and sends a request 223 to the repository server 135. The package is bundled to include the IPIS information and sent to the package manager client 125 in package delivery 224 transmission (i.e., a download). For example, bundled package 230 includes meta-information portion 231 and software package payload portion 232 with an industrial application package or functional blocks of an industrial application industrial application package. The meta-information portion 231 could generally be encoded in different ways, including but not limited to JSON, via XML Schema, in CSV, or other ways. In an embodiment, a knowledge graph may be employed to contain the IPIS, as well as package content in ontology format, which provides representation in terms of connected data and relations between different parts of the IPIS. Bundled package 230 may a compressed, encrypted bundle of folders and files following the description in the IPIS. The package manager client 125 can employ a queue to track open package requests. When the package is unbundled by the unbundling tool 129 of package manager client 125, the IPIS information is extracted and processed. In an embodiment, a peer to peer based event distribution may be established across the various server repositories for industrial security notices or newly available packages and package versions.

As shown in FIG. 2B, the IPIS may be defined to include, but not limited to include one or more of the following meta-information components relating to an industrial application package: interfacing information and usage samples 201, binaries for different target systems 202, hardware compatibility information 203 (for example with PLCs, HMIs, Robots, etc.), package dependencies 204, provider information 205 (e.g., package creator name and purpose for package creation), engineering software compatibility information 206, engineering software data/add-ons/integrations 207, custom attachments 208 (e.g., in text-, binary- or other form), test programs 209 and optionally test source code, domain specific software source code 210 (programmable logic controller (PLC) programs, human-machine interface (HMI) screens, robot programs, etc.), performance specifications/limitations 211, hardware recommendations 212 (e.g., including links to vendors), documentation of the package contents 213 (e.g., instructions for version upgrade, etc.), vendor information about package related services 214, licensing information 215, and known IT security vulnerabilities 216.

In an embodiment, an industrial application package may be bundled with interfacing and usage sample information 201 as follows. Depending on the technology, interfacing information 201 identifies specific components or data schemas required to interface and usage samples include program examples demonstrating how to interface. To assist a package user, the information 201 may include a summary related to how the packaged industrial application package is designed to be used. For example, such information for an automation software program package may summarize aspects related to how specific control parameters may be defined, obtained, or adjusted for operating a particular robot to perform a production task in the industrial system 150.

Usage sample information may include one or more samples of how the program will appear to a user when the program is deployed and used, such as data field tagging, program language samples (e.g., specific ways to call a block), formalized samples, or machine readable samples. For example, during an engineering phase of an industrial system 150, as a software program is being developed by assembling various industrial application packages from server based repositories 135, an engineer may investigate which package is appropriate for a given task in an engineering project by selecting from available packages with different versions as a sampling process. In an embodiment, the particular repository 135 may be identified by the user as provided by an equipment vendor and the package exchange may be initiated by the user via the package manager client 125. In other embodiments, the link to repository 135 may be identified by reading a knowledge graph (e.g., ontology based) or knowledge database that stores package links to repositories 135 according to best practices for respective industries. As each industrial application package is sampled by the engineer, the sample information 201 allows the engineer to understand how the package is used for the program, by viewing textual information, graphical information, or a combination of both, illustrating how the program appears in graphical language. In an aspect, a provider may bundle industrial application packages divided into parts, such that usage samples 201 may be delivered separately from a package containing that software application, in which case, additional dependencies are the result. For example, the provider may intend to allow a user to view usage samples 201 prior to requesting and accepting the full software package. Other divisions of package bundling and delivery may be deployed to include various clusters of IPIS meta-information, with or without the software application program, tailored to the technology domain and needs of the particular industry being served.

In an embodiment, IPIS meta-information for engineering software compatibility 206 includes a warning that package interfacing may be incompatible for certain versions of a software application. For example, in a case where an industrial application package has been created with engineering software information dedicated to a software application version 8, but the latest version of the software application is version 10, the compatibility information 206 may include a warning that package interfacing may be incompatible. In an aspect, the package request by the package manager client 125 may be for data content to be used for an engineering software application, not for the application as a whole, and the delivered package may include a warning that data of the requested package may not be compatible with the currently installed engineering software application version. The package manager client 125 in conjunction with upgrade analyzer 124 may determine an appropriate version to switch to as a solution for identification of the incompatible version. In an embodiment, IPIS meta-information for engineering software compatibility 206 also includes a warning that package interfacing may be incompatible for a particular piece of hardware.

Regarding IPIS meta-information for engineering software add-ons and integrations 207, an application programming interface (API) may provide pieces that can run in the context of the engineering software, to automate a specific task of engineering, and could be specific to a hardware product (e.g., a conveyor manufacturer may provide an add-on as an easy way to configure a 3D model or simulation model, with different upgrade packages). An add-on to an engineering software can utilize the programming interface of the engineering software and extend the user interface of the engineering software. Examples of engineering software integrations with an industrial application package include, but are not limited to, automation project engineering software (e.g., TIA portal) including automation and HMI engineering, Siemens NX CAD/CAM application, process simulation behavior modeling software, plant simulation material flow or logistics modeling software, product lifetime management (PLM) modeling software (e.g., Siemens Teamcenter). An advantage of integrating the package manager with engineering application software is that a software development environment is enabled within the engineering domain for improvement of engineering tools with automatic linkage to software repository locations and automatic handling of version conflicts.

As an example of an IPIS component implementation, security vulnerabilities 216 information may be included in the IPIS for an industrial application package after security flaws in implementation are discovered. The provider of an industrial application package may release a new package version to include fixes for the vulnerability. In order to support the users of the industrial application package, the package management system 100 utilizes the security vulnerability manager component 126 to track vulnerabilities existing in packages that have been downloaded in a project and offer solutions, if available. In an aspect, the package manager client 125, upon identifying the security vulnerabilities information 216 in the downloaded industrial application package indicating fixed vulnerabilities, may initiates an upgrade analysis by the upgrade analyzer 124 to look for any existing dependencies of libraries to the vulnerable package version (e.g., the package version previous to the newly downloaded package version) and check for any other upgrades required. In this way, the IPIS information is useful for continuous screening of package dependency versions.

In an aspect, a vendor's software may include various representations for different engineering systems (e.g., a 3D model for a first engineering tool, an automation program for a second engineering tool, a simulation model for a third engineering tool). A vendor industrial application package may be offered to an engineer to make the engineering job easier. In this example, all of the following IPIS components could be included for such a package: interfacing information and usage samples 201, binaries for different target systems 202, hardware compatibility information (for example with PLCs, HMIs, Robots, etc.) 203, package dependencies 204, provider information 205 (e.g., creator of package and for what purpose), engineering software compatibility information 206, engineering software data/add-ons/integrations 207, and custom attachments 208.

Various combinations of the aforementioned IPIS components are possible, and any one may be created and attached to the IPIS of a bundled industrial application package. In an aspect, a vendor may offer binaries 202 only, engineering software integrations 207 only, or any combination of the examples described for a particular package.

Figure 3:
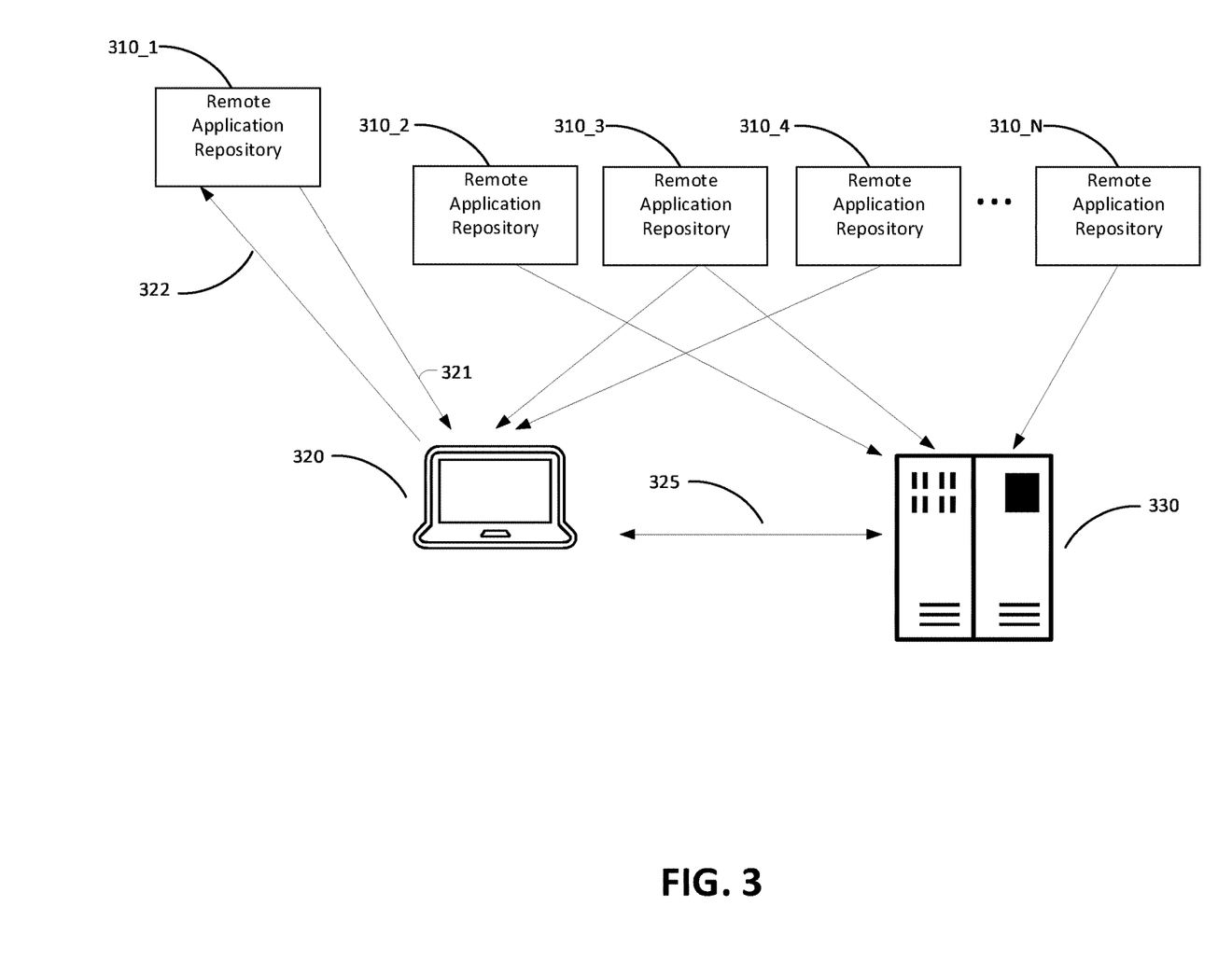
FIG. 3 illustrates an example package management in accordance with the disclosure.

FIG. 3 illustrates an example of industrial application package management in accordance with the disclosure. An industrial system may include a client 320, such as a general purpose computer (e.g., a personal computer), and specialized industrial controller 330, such as a programmable logic controller that has a real time operating system for executing a control program. The general-purpose computer 320 can host an automation package manager integrated with the vendor specific automation engineering system (e.g., TIA Portal for the Siemens SIMATIC controllers). In an embodiment, the integration is implemented such that the package manager operates in the background during a session of using an engineering software tool, making package selection to a user available, including information about the industrial application packages that is specific to the particular engineering software tool. For example, for industrial application packages with information related to PLC 330, the integrated package manager may provide information to the user compatible with hardware of the engineering system controlled by the PLC 330. In an example where an engineer is running an application on a client 320 implemented as a TIA Portal, the remote application repository 310_1 may be accessed by the package manager operating in the background, such that the engineer never needs to leave the engineering program.

From a user point of view, the repositories are vendor independent, and industrial application package development and hosting may occur in either of two ways. In an embodiment, the industrial application package is stored in an independent source format at remote application repository 310_1 and compiled/assembled to a vendor specific package in response to a client 320 request. For example, an automation software application hosted by repository 310_1 may be applied to various robots of different vendors, and a client user of the application is designing a system for a particular robot of vendor B. The industrial application package may be compiled and bundled by the repository with data specific to the robot of vendor B and sent the user client in response to the request. In another embodiment, repository 310_1 contains a variant of the industrial application package for each vendor supporting the package, whereby in response to a user at client 320 providing the industrial application package name and version, the appropriate variant of the industrial application package for the vendor specific client software is bundled and downloaded to the client.

If the industrial application package is built from source code, the source code can be compiled on the server close to the repository (e.g., in the cloud), or the source code can be downloaded onto the client computer 320 and the package manager is configured to use the appropriate compiler (e.g. the compiler can be part of the vendor specific automation engineering system) to compile the source code into a package for download 321. The server-side package building may be more convenient for the user and can better protect a vendor's proprietary information (e.g., intellectual property) of the industrial application package.

In an embodiment, a vendor may provide industrial application package information in download 321 to client 320, having a package manager client deployed, where the package data is bundled using the IPIS with any relevant information into an industrial application package. For example, a robotics application package could be provided by a vendor offering a robotics solution and could contain robotics programming for a specific use case, such as point-welding of sheet metal pieces. The IPIS for the package download 321 may include information, for example, such as sample program and CAD-software integrations, 3D models and simulation behavior descriptions of the robot for process simulation, documentation detailing how to use the industrial application package in a custom deployment and how to integrate it with automation solutions, and any necessary interfacing information if multiple robots are involved in the scenario.

Special machines require specific drivers and interfacing for automation software. In an example of an industrial application package creation for a special machine, the IPIS for the package may contain information related to the specific drivers and interfacing and usage scenario examples. For example, a vendor of an automated milling machine could offer various industrial application packages, such as one that contains the basic drivers, several that contain the automation sample programs for specific usage scenarios, and additional packages for integration with a monitoring solution. These industrial application packages can be interdependent, such as usage scenario specific packages being dependent on the driver package.

Returning to FIG. 3, in an embodiment, an engineer may bundle an industrial application package using a package manager client at client 320 to include information relevant to a design project with all software dependencies, where information of each application is retrieved from respective repositories 310_1, 310_2 . . . 310_N, bundled, and uploaded as a new or modified package 322 to one of the repositories. In an aspect, the industrial application package may be saved locally at client 320 for private use on future projects, and not saved as a modified vendor package at the vendor's repository 310_1.

In an embodiment, PLC 330 has a program manager client 125 deployed to enable security vulnerability management, licensing, testing, or on-machine-development directly on the PLC 330. For example, client 320 may download 325 a test program onto an industrial controller 330 using a network connection to test run the program. In an embodiment, an operator may access a package at client 320 or at a user interface of PLC 330 for running a user initiated upgrade operation using upgrade analyzer 124, or for running a security check for software vulnerabilities using security vulnerability manager 126.

Figure 4:
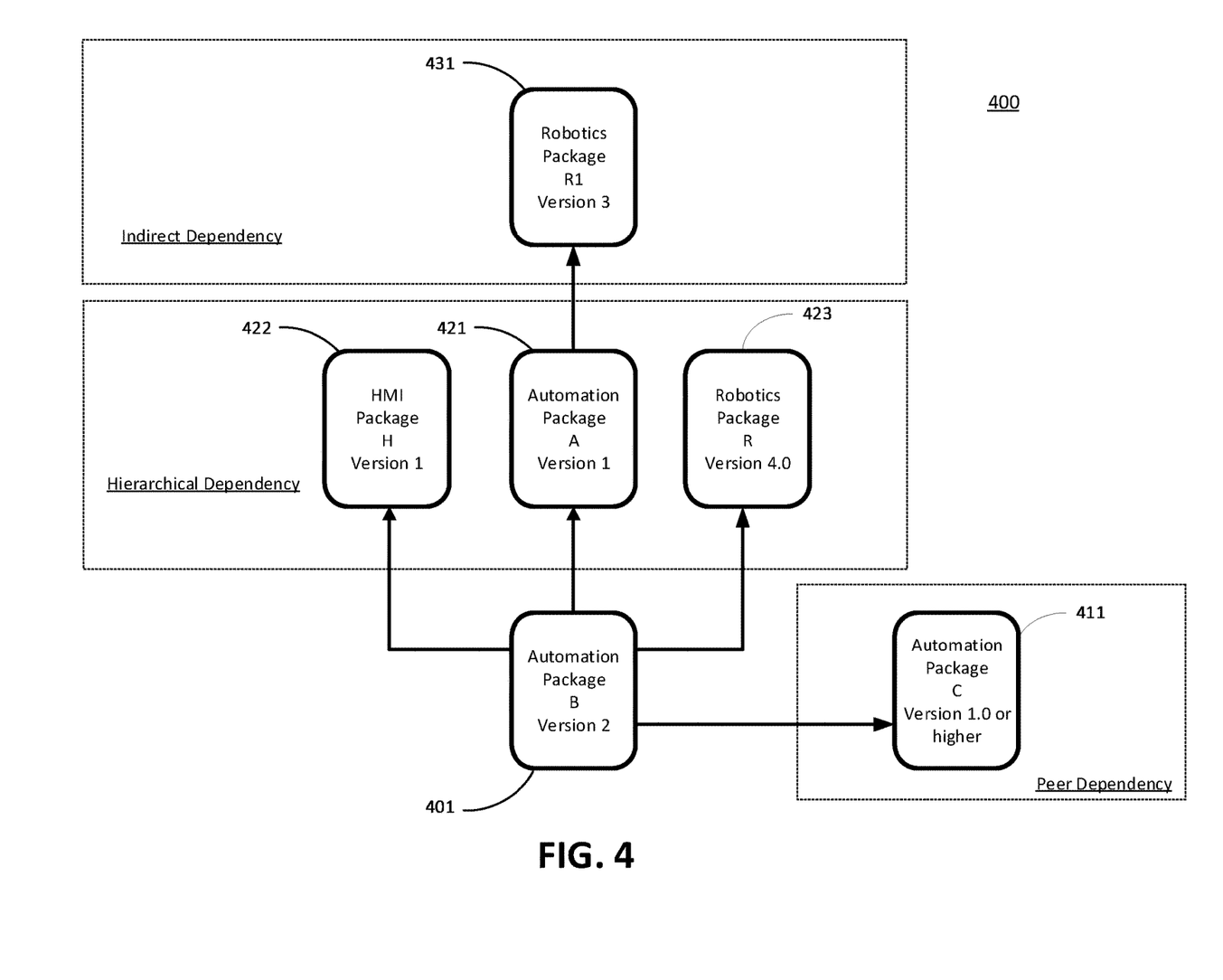
FIG. 4 shows a block diagram of an example for a dependency tree associated with industrial application package dependencies in accordance with embodiments of the disclosure.

FIG. 4 shows a block diagram of an example for a dependency tree associated with industrial application package dependencies in accordance with embodiments of the disclosure. Dependency tree 400 may be generated by industrial application package management system 100 as a reference map when evaluating an upgrade for any package, whether by user request for an upgrade, or when system 100 determines that an upgrade may be necessary in response to detecting a security vulnerability. Dependency tree 400 represents dependencies for industrial application package 401 as a simplistic illustrative example. Actual dependency trees for a typical industrial application package may include tens or hundreds of dependencies along various dependency chains. Any industrial application package, such as package 401, may have one or more types of dependency to other packages, such as peer dependency shown between package 401 and 411, hierarchical dependency as shown between package 401 and each of packages 421, 422, and 423, and indirect dependency as shown between package 401 and package 431. As shown, each industrial application package is identified by name and version, such as package 401 labeled as automation package B, version 2. Dependency chains for package 401 include the different paths of dependency, such as a first dependency chain of packages 401, 421, 431, and a second dependency chain of packages 401, 422. Each of the industrial application packages in dependency tree 400 have their own dependency tree, respectively, but are not shown.

Dependency tree 400 includes information for each package dependency expressed as relative to either a precise version (e.g., ver 1.0.0.14), or an imprecise version (e.g., ver 1.0 or higher) (see package 411). Versions can be expressed as major versions (e.g., version 1, version 2) (see package 401) or as minor version (e.g., version 1.0, version 1.1, version 1.2) (see package 423). In an aspect, information for incompatibilities of versions may be recorded and included within the IPIS component for package dependencies 204. For example, incompatibilities may arise for a version upgrade that changes the interfacing with the industrial application package (IPIS component 201) and manual adoptions may be required to keep existing solutions working. The dependency tree information is included in the IPIS for package 401 as package dependency component 204.

According to embodiments of the disclosure, a solution is provided for a technical problem of finding, installing, removing correct version of software packages for industrial applications, such as automation controllers, HMIs, robotics and associated automation engineering software systems from software repositories with minimal or no effort on the part of the user. Using the industrial application package manager described herein, the following steps for finding and installing the industrial application packages are fully automated:

- Selecting the correct internet-based/cloud-based repository or repositories for installed version(s) of engineering system software and industrial controller software;
- Installing extensions/add-ins to automation engineering system software;
- Installing libraries of function blocks and functions for an industrial system, in binary or source code;
- Ensuring that package dependencies are automatically resolved;
- Consistent and complete removal of installed software that is no longer in use or being replaced by upgrade; cleaning up unused dependencies and issuing warnings or preventing the software removal if still being used;
- Allowing side-by-side installation of industrial application packages so that different versions are available for existing dependencies, such as each of two software packages having dependencies on different library versions;
- Analysis on upgrade of software packages for industrial applications and their dependencies.

Figure 5:
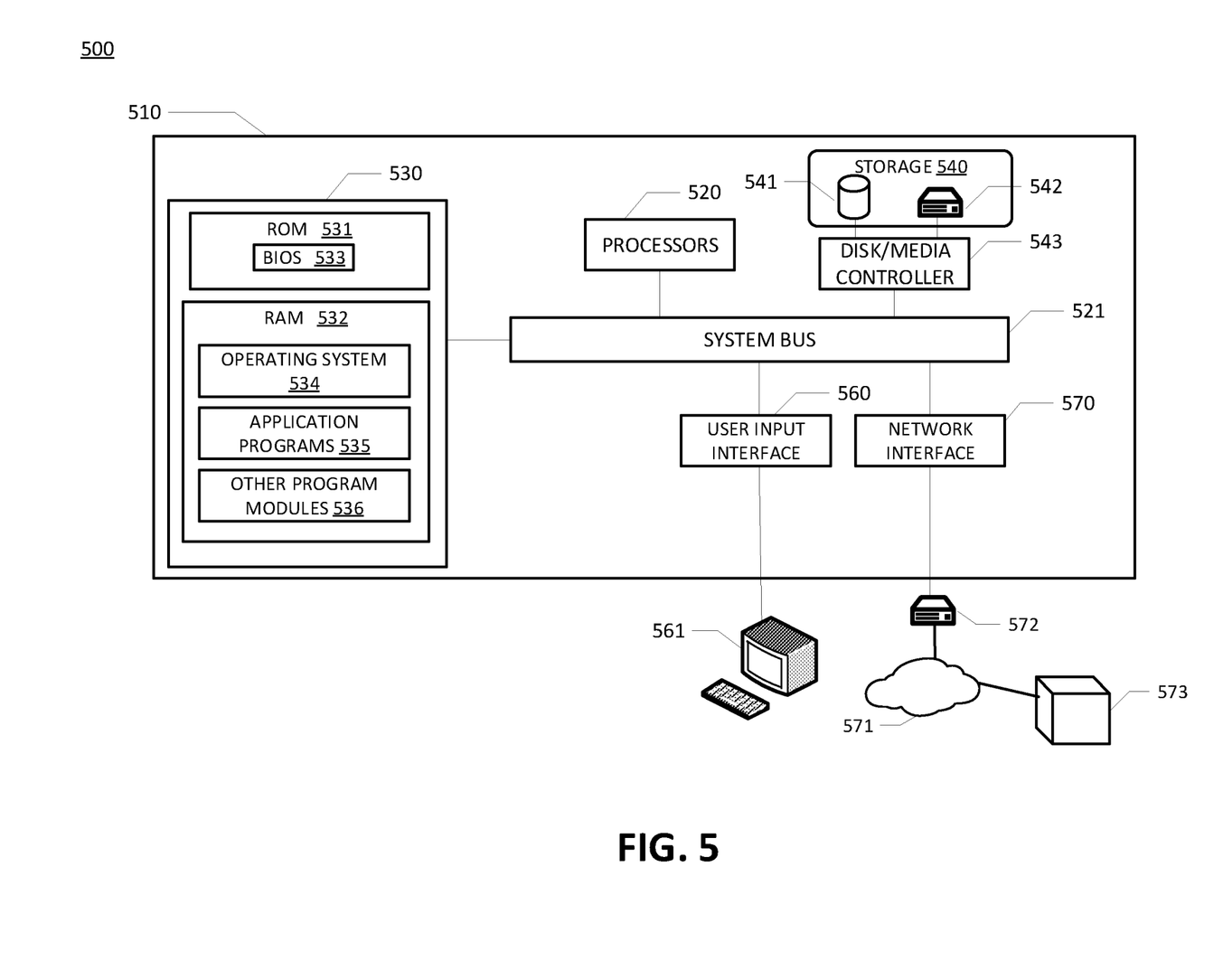
FIG. 5 shows an example of a computing environment within which embodiments of the disclosure may be implemented.

FIG. 5 illustrates an example of a computing environment within which embodiments of the present disclosure may be implemented. A computing environment 500 includes a computer system 510 that may include a communication mechanism such as a system bus 521 or other communication mechanism for communicating information within the computer system 510. The computer system 510 further includes one or more processors 520 coupled with the system bus 521 for processing the information. In an embodiment, computing environment 500 corresponds to industrial system 150 as shown in FIG. 1 for industrial application package management, in which the computer system 510 relates to a computer such as the computing device 105, described below in greater detail.

The processors 520 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 520 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between.

The system bus 521 may include at least one of a system bus, a memory bus, an address bus, or a message bus, and may permit exchange of information (e.g., data (including computer-executable code), signaling, etc.) between various components of the computer system 510. The system bus 521 may include, without limitation, a memory bus or a memory controller, a peripheral bus, an accelerated graphics port, and so forth. The system bus 521 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 5, the computer system 510 may also include a system memory 530 coupled to the system bus 521 for storing information and instructions to be executed by processors 520. The system memory 530 may include computer readable storage media in the form of volatile and/or nonvolatile memory, such as read only memory (ROM) 531 and/or random access memory (RAM) 532. The RAM 532 may include other dynamic storage device(s) (e.g., dynamic RAM, static RAM, and synchronous DRAM). The ROM 531 may include other static storage device(s) (e.g., programmable ROM, erasable PROM, and electrically erasable PROM). In addition, the system memory 530 may be used for storing temporary variables or other intermediate information during the execution of instructions by the processors 520. A basic input/output system 533 (BIOS) containing the basic routines that help to transfer information between elements within computer system 510, such as during start-up, may be stored in the ROM 531. RAM 532 may contain data and/or program modules that are immediately accessible to and/or presently being operated on by the processors 520. System memory 530 may additionally include, for example, operating system 534, application modules 535, and other program modules 536. Application modules 535 may include aforementioned application manager 121, package manager client 125, upgrade analyzer 124, and system vulnerability manager 126 described for FIG. 1, and may also include a user portal for development of industrial application packages, allowing input parameters to be entered and modified as necessary.

The operating system 534 may be loaded into the memory 530 and may provide an interface between other application software executing on the computer system 510 and hardware resources of the computer system 510. More specifically, the operating system 534 may include a set of computer-executable instructions for managing hardware resources of the computer system 510 and for providing common services to other application programs (e.g., managing memory allocation among various application programs). In certain example embodiments, the operating system 534 may control execution of one or more of the program modules depicted as being stored in the data storage 540. The operating system 534 may include any operating system now known or which may be developed in the future including, but not limited to, any server operating system, any mainframe operating system, or any other proprietary or non-proprietary operating system.

The computer system 510 may also include a disk/media controller 543 coupled to the system bus 521 to control one or more storage devices for storing information and instructions, such as a magnetic hard disk 541 and/or a removable media drive 542 (e.g., floppy disk drive, compact disc drive, tape drive, flash drive, and/or solid state drive). Storage devices 540 may be added to the computer system 510 using an appropriate device interface (e.g., a small computer system interface (SCSI), integrated device electronics (IDE), Universal Serial Bus (USB), or FireWire). Storage devices 541, 542 may be external to the computer system 510.

The computer system 510 may include a user input interface or graphical user interface (GUI) 561, which may comprise one or more input devices, such as a keyboard, touchscreen, tablet and/or a pointing device, for interacting with a computer user and providing information to the processors 520.

The computer system 510 may perform a portion or all of the processing steps of embodiments of the invention in response to the processors 520 executing one or more sequences of one or more instructions contained in a memory, such as the system memory 530. Such instructions may be read into the system memory 530 from another computer readable medium of storage 540, such as the magnetic hard disk 541 or the removable media drive 542. The magnetic hard disk 541 and/or removable media drive 542 may contain one or more data stores and data files used by embodiments of the present disclosure. The data store 540 may include, but are not limited to, databases (e.g., relational, object-oriented, etc.), file systems, flat files, distributed data stores in which data is stored on more than one node of a computer network, peer-to-peer network data stores, or the like. Data store contents and data files may be encrypted to improve security. The processors 520 may also be employed in a multi-processing arrangement to execute the one or more sequences of instructions contained in system memory 530. In alternative embodiments, hard-wired circuitry may be used in place of or in combination with software instructions. Thus, embodiments are not limited to any specific combination of hardware circuitry and software.

As stated above, the computer system 510 may include at least one computer readable medium or memory for holding instructions programmed according to embodiments of the invention and for containing data structures, tables, records, or other data described herein. The term "computer readable medium" as used herein refers to any medium that participates in providing instructions to the processors 520 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 541 or removable media drive 542. Non-limiting examples of volatile media include dynamic memory, such as system memory 530. Non-limiting examples of transmission media include coaxial cables, copper wire, and fiber optics, including the wires that make up the system bus 521. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computing environment 500 may further include the computer system 510 operating in a networked environment using logical connections to one or more remote computers, such as remote computing device 573. The network interface 570 may enable communication, for example, with other remote devices 573 or systems and/or the storage devices 541, 542 via the network 571. Remote computing device 573 may be a personal computer (laptop or desktop), a mobile device, a server, a router, a network PC, a peer device or other common network node, and typically includes many or all of the elements described above relative to computer system 510. In an embodiment, a remote application depository 110 server may be implemented as remote computing device 573. When used in a networking environment, computer system 510 may include modem 572 for establishing communications over a network 571, such as the Internet. Modem 572 may be connected to system bus 521 via user network interface 570, or via another appropriate mechanism.

In an embodiment, network 571 corresponds to network 115 as shown in FIG. 1. Network 571 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 510 and other computers (e.g., remote computing device 573). The network 571 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 571.

It should be appreciated that the program modules, applications, computer-executable instructions, code, or the like depicted in FIG. 5 as being stored in the system memory 530 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 510, the remote device 573, and/or hosted on other computing device(s) accessible via one or more of the network(s) 571, may be provided to support functionality provided by the program modules, applications, or computer-executable code depicted in FIG. 5 and/or additional or alternate functionality. Further, functionality may be modularized differently such that processing described as being supported collectively by the collection of program modules depicted in FIG. 5 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 5 may be implemented, at least partially, in hardware and/or firmware across any number of devices.

It should further be appreciated that the computer system 510 may include alternate and/or additional hardware, software, or firmware components beyond those described or depicted without departing from the scope of the disclosure. More particularly, it should be appreciated that software, firmware, or hardware components depicted as forming part of the computer system 510 are merely illustrative and that some components may not be present or additional components may be provided in various embodiments. While various illustrative program modules have been depicted and described as software modules stored in system memory 530, it should be appreciated that functionality described as being supported by the program modules may be enabled by any combination of hardware, software, and/or firmware. Each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

The Figures illustrate the architecture, functionality, and operation of possible implementations of systems, methods, and computer program products according to various embodiments of the present disclosure. In this regard, each block in block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A system for industrial application package management, comprising:
   a computing device comprising a processor and a memory having executable programs and applications stored thereon, comprising:
   a plurality of software application programs running an engineering project involving multiple different disciplines, the project using packages of software data, the packages having interdependencies;
   a package manager client, configured to:
      communicate with a plurality of remote repository servers hosting industrial application packages, wherein the package manager client sends requests for industrial application packages and receives deliveries of industrial application packages, wherein each of the industrial application packages is versioned and bundled according to an industrial package information schema, and
      unbundle the industrial application packages to retrieve package data including package meta-information relevant to each industrial application package and to a domain specific application;
   the package manager client comprising a dependency tracking module configured to:

identify package dependencies of a first version of a first industrial application package and of an update version of the first industrial application package, and generate a first dependency tree for the first version and a second dependency tree for the update version of the first industrial application package including the name and version of each industrial application package of the identified package dependencies; and an upgrade analyzer configured to:

compare the first dependency tree and the second dependency tree to identify dependency incompatibilities as conflicting packages based on inconsistencies; and perform an automated resolution of the dependency incompatibilities.

2. The system of claim 1, wherein the automated resolution performed by the upgrade analyzer comprises:

executing a first attempt for resolution by upgrading the conflicting packages to later versions that are known to be compatible;

on a condition that there are remaining unresolved conflicting packages, executing a second attempt for resolution by downgrading more advanced versions of industrial application packages to achieve a degree of compatibility within a specified range; and on a condition that there are remaining unresolved conflicting packages, executing a third attempt for resolution by upgrading industrial application packages to new versions with unknown compatibility and performing a test compile to determine potential compatibility.

3. The system of claim 1, further comprising:

a security vulnerability analyzer configured to investigate each package version used in the dependency tree of a package and to track identified vulnerabilities with respect to downloaded packages.

4. The system of claim 1, wherein the plurality of software application programs includes an engineering software, wherein the package manager client is integrated with the engineering software allowing the user to operate the engineering software while the package manager client operates in the background to identify packages compatible with target hardware being designed by the engineering software.

5. The system of claim 1, wherein the meta-information includes samples of interfacing and usage information.

6. The system of claim 1, wherein the meta-information includes binaries for different target systems.

7. The system of claim 1, wherein the meta-information includes hardware compatibility information.

8. The system of claim 1, wherein the meta-information includes package dependencies.

9. The system of claim 1, wherein the meta-information includes package provider information.

10. The system of claim 1, wherein the meta-information includes engineering software compatibility information.

11. The system of claim 1, wherein the meta-information includes engineering software data add-on and integration information.

12. The system of claim 1, wherein the meta-information includes custom attachment information.

13. The system of claim 1, wherein the meta-information includes test program information.

14. The system of claim 1, wherein the meta-information includes domain specific software source code.

15. The system of claim 1, wherein the meta-information includes performance specifications/limitations.

16. The system of claim 1, wherein the meta-information includes hardware recommendations.

17. The system of claim 1, wherein the meta-information includes documentation of a package's contents.

18. The system of claim 1, wherein the meta-information includes vendor information about package related services.

19. The system of claim 1, wherein the meta-information includes known information technology (IT) security vulnerabilities.

20. The system of claim 1, further comprising:

a bundling tool configured to bundle packages authored by a user, the packages bundled in accordance with the industrial package information schema.

* * * * *